US012809976B2

(12) United States Patent
Klimovitsky et al.

(10) Patent No.: US 12,809,976 B2
(45) Date of Patent: Nov. 24, 2026

(54) TECHNIQUES FOR CYBERSECURITY THREAT SUMMARIZATION AND REMEDIATION UTILIZING GENERATIVE ARTIFICIAL INTELLIGENCE

(71) Applicant: Wiz, Inc., New York, NY (US)

(72) Inventors: Alice Klimovitsky, Tel Aviv (IL); Itay Harel, Tel Aviv (IL); Erez Harush, Tel Aviv (IL); Tal Waitzenberg, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 19/188,631

(22) Filed: Apr. 24, 2025

(65) Prior Publication Data

US 2026/0340114 A1 Oct. 29, 2026

(51) Int. Cl.
*H04L 9/40* (2022.01)
*G06F 21/55* (2013.01)
*G06N 7/01* (2023.01)

(52) U.S. Cl.
CPC .......... *G06F 21/554* (2013.01); *G06F 21/552* (2013.01)

(58) Field of Classification Search
CPC ............................. G06F 21/554; G06F 21/552
USPC ............................................................ 726/22
See application file for complete search history.

(56) References Cited

U.S. PATENT DOCUMENTS

| | | | |
|---|---|---|---|
| 9,256,739 B1 | 2/2016 | Roundy et al. | |
| 9,824,609 B2 | 11/2017 | Sadeh-Koniecpol et al. | |
| 11,201,890 B1 * | 12/2021 | Coull | G06F 16/9024 |
| 11,683,333 B1 | 6/2023 | Dominessy et al. | |
| 11,729,203 B2 | 8/2023 | Kras et al. | |
| 11,757,907 B1 * | 9/2023 | Berger | G06N 7/01 726/23 |
| 12,225,031 B1 * | 2/2025 | Coull | H04L 63/1425 |
| 12,323,449 B1 * | 6/2025 | Graves | G06F 9/545 |
| 2018/0219888 A1 | 8/2018 | Apostolopoulos | |
| 2019/0132344 A1 | 5/2019 | Lem et al. | |
| 2020/0128047 A1 * | 4/2020 | Biswas | H04L 67/10 |
| 2020/0137083 A1 | 4/2020 | Chen et al. | |
| 2020/0285737 A1 * | 9/2020 | Kraus | G06F 21/552 |
| 2021/0126938 A1 * | 4/2021 | Trost | G06F 21/552 |
| 2021/0248443 A1 | 8/2021 | Shu et al. | |
| 2022/0006830 A1 | 1/2022 | Wescoe | |
| 2022/0210200 A1 | 6/2022 | Crabtree et al. | |
| 2022/0247773 A1 * | 8/2022 | Caithness | G06F 21/552 |

(Continued)

*Primary Examiner* — Phy Anh T Vu
(74) *Attorney, Agent, or Firm* — M&B IP Analysts, LLC

(57) ABSTRACT

A system and method for remediating a cybersecurity threat based on timeline generation utilizing generative artificial intelligence (AI) is presented. The method includes selecting a group of remediation actions from a plurality of remediation actions, each remediation action executable in a computing environment; detecting a cybersecurity threat in the computing environment, the cybersecurity threat associated with at least an identity; generating a timeline based on the at least an identity, wherein the timeline includes a plurality of detected events in the computing environment; generating a context based at least on the generated timeline and the selected group of remediation actions; processing a prompt utilizing a generative AI model including the generated context, wherein the prompt, when processed by the generative AI model, outputs at least a remediation action; and initiating the at least a remediation action in the computing environment.

15 Claims, 10 Drawing Sheets

(56) References Cited

U.S. PATENT DOCUMENTS

| | | | | |
|---|---|---|---|---|
| 2023/0164567 | A1* | 5/2023 | Fellows | H04L 63/1425<br>455/410 |
| 2023/0315884 | A1 | 10/2023 | Pham | |
| 2024/0411896 | A1* | 12/2024 | Myers | G06F 21/552 |
| 2024/0427879 | A1* | 12/2024 | Bulut | G06F 21/554 |
| 2025/0077655 | A1* | 3/2025 | Schindel | G06F 21/554 |
| 2025/0119435 | A1* | 4/2025 | Boyer | G06F 16/353 |
| 2025/0156533 | A1* | 5/2025 | Wada | G06F 21/55 |

* cited by examiner

TECHNIQUES FOR CYBERSECURITY THREAT SUMMARIZATION AND REMEDIATION UTILIZING GENERATIVE ARTIFICIAL INTELLIGENCE

TECHNICAL FIELD

The present disclosure relates generally to cybersecurity threat detection and specifically to utilizing generative Artificial Intelligence for cybersecurity threat summarization, timeline generation, and activity graph generation.

BACKGROUND

Cybersecurity alerts are overwhelming primarily due to the sheer volume and frequency with which they are generated. Modern security systems continuously monitor networks, devices, and applications, often producing thousands of alerts daily. Many of these alerts are false positives or minor issues, but each requires some level of attention to validate and classify. This constant stream of notifications makes it difficult for security teams to distinguish between critical threats and routine noise.

As alerts accumulate, analysts face significant pressure to respond quickly, leading to alert fatigue, a state of mental exhaustion and desensitization. Over time, this can dull an analyst's ability to react appropriately, causing genuine threats to be missed or not prioritized. The repetitive nature of triaging low-impact or irrelevant alerts also reduces motivation and focus, which further hinders the decision-making process.

This degradation in vigilance directly affects remediation efforts. Delays in identifying real threats mean that attackers have more time to exploit vulnerabilities or move laterally within systems. Additionally, alert fatigue often results in slower response times and a tendency to overlook contextual clues that are essential for effective mitigation. In critical moments, teams might fail to coordinate properly or lack the energy to investigate threats thoroughly, increasing the chances of damage from breaches. Ultimately, the relentless volume of alerts diminishes the overall effectiveness of cybersecurity operations.

The human mind, therefore, is simply incapable of addressing cybersecurity issues in real-time in order to remediate or mitigate these issues.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that, in operation, causes or cause the system to perform the actions. One or more computer programs can be configured to perform particular operations or actions by virtue of including instructions that, when executed by data processing apparatus, cause the apparatus to perform the actions.

In one general aspect, a method may include selecting a group of remediation actions from a plurality of remediation actions, each remediation action executable in a computing environment. The method may also include detecting a cybersecurity threat in the computing environment, the cybersecurity threat associated with at least an identity. The method may furthermore include generating a timeline based on the at least an identity, where the timeline includes a plurality of detected events in the computing environment. The method may in addition include generating a context based at least on the generated timeline and the selected group of remediation actions. The method may moreover include processing a prompt utilizing a generative AI model including the generated context, where the prompt, when processed by the generative AI model, outputs at least a remediation action. The method may also include initiating the at least a remediation action in the computing environment. Other embodiments of this aspect include corresponding computer systems, apparatus, and computer programs recorded on one or more computer storage devices, each configured to perform the actions of the methods.

Implementations may include one or more of the following features. The method may include: generating a plurality of remediation actions. The method may include: initiating a first remediation action of the plurality of remediation actions, where the first remediation action is directed to a first environment of the computing environment; and initiating a second remediation action of the plurality of remediation actions, where the second remediation action is directed to a second environment of the computing environment. The method may include: initiating a first remediation action of the plurality of remediation actions, where the first remediation action is directed to a first layer of the computing environment; and initiating a second remediation action of the plurality of remediation actions, where the second remediation action is directed to a second layer of the computing environment. The method where generating the context further may include: generating a threat summary based on the plurality of detected events; and generating the context based on at least a portion of the threat summary. The method where generating a threat summary further may include: generating a plurality of prompts, each generated based on an unique prompt template and at least an identifier of an entity of the computing environment; and processing each of the plurality of prompts. The method where the entity is a principal of the computing environment. The method may include: generating the threat summary based at least on a portion of each result of processing each of the plurality of prompts. Implementations of the described techniques may include hardware, a method or process, or a computer tangible medium.

In one general aspect, a non-transitory computer-readable medium may include one or more instructions that, when executed by one or more processors of a device, cause the device to: select a group of remediation actions from a plurality of remediation actions, each remediation action executable in a computing environment; detect a cybersecurity threat in the computing environment, the cybersecurity threat associated with at least an identity; generate a timeline based on the at least an identity, where the timeline includes a plurality of detected events in the computing environment; generate a context based at least on the generated timeline and the selected group of remediation actions; process a prompt utilizing a generative AI model including the generated context, where the prompt, when processed by the generative AI model, outputs at least a remediation action; and initiate the at least a remediation action in the computing environment. Other embodiments of this aspect include corresponding computer systems, apparatus, and computer programs recorded on one or more computer storage devices, each configured to perform the actions of the methods.

In one general aspect, a system may include a processing circuitry. The system may also include a memory, the memory containing instructions that, when executed by the processing circuitry, configure the system to: select a group of remediation actions from a plurality of remediation actions, each remediation action executable in a computing environment. The system may in addition detect a cybersecurity threat in the computing environment, the cybersecurity threat associated with at least an identity. The system may moreover generate a timeline based on the at least an identity, where the timeline includes a plurality of detected events in the computing environment. The system may also generate a context based at least on the generated timeline and the selected group of remediation actions. The system may furthermore process a prompt utilizing a generative AI model including the generated context, where the prompt, when processed by the generative AI model, outputs at least a remediation action. The system may in addition initiate the at least a remediation action in the computing environment. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: generate a plurality of remediation actions. The system where the memory contains further instructions which when executed by the processing circuitry further configure the system to: initiate a first remediation action of the plurality of remediation actions, where the first remediation action is directed to a first environment of the computing environment; and initiate a second remediation action of the plurality of remediation actions, where the second remediation action is directed to a second environment of the computing environment. The system where the memory contains further instructions which when executed by the processing circuitry further configure the system to: initiate a first remediation action of the plurality of remediation actions, where the first remediation action is directed to a first layer of the computing environment; and initiate a second remediation action of the plurality of remediation actions, where the second remediation action is directed to a second layer of the computing environment. The system where the memory contains further instructions that, when executed by the processing circuitry for generating the context, further configure the system to: generate a threat summary based on the plurality of detected events; and generate the context based on at least a portion of the threat summary. The system where the memory contains further instructions that, when executed by the processing circuitry for generating a threat summary, further configure the system to: generate a plurality of prompts, each generated based on an unique prompt template and at least an identifier of an entity of the computing environment; and process each of the plurality of prompts. The system where the entity is a principal of the computing environment. The system where the memory contains further instructions which when executed by the processing circuitry further configure the system to: generate the threat summary based at least on a portion of each result of processing each of the plurality of prompts. Implementations of the described techniques may include hardware, a method or process, or a computer-tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
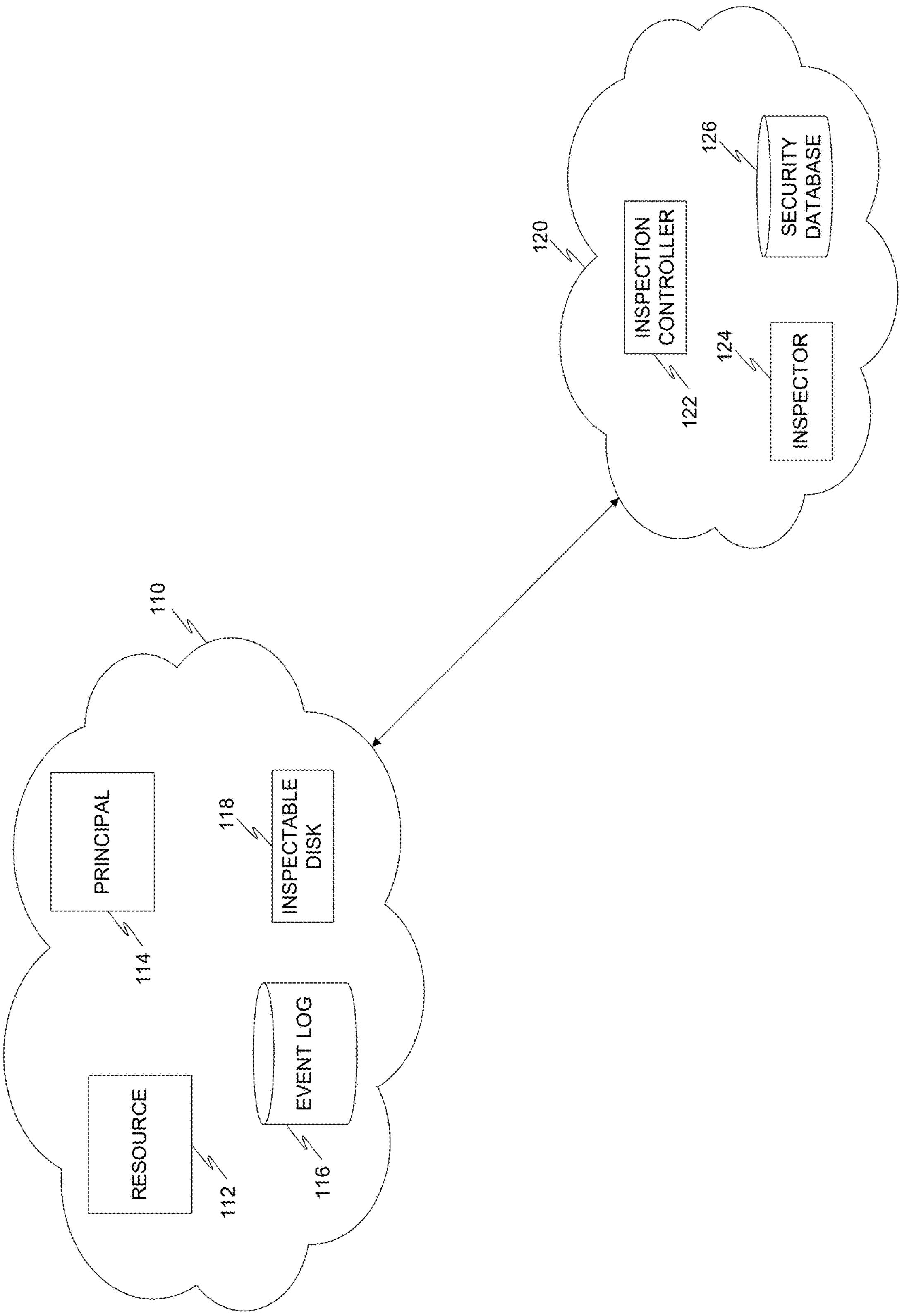
FIG. 1 is an example schematic illustration of a computing environment including a cybersecurity issue, utilized to describe an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is an example schematic illustration of a computing environment including a cybersecurity issue, utilized to describe an embodiment. In an embodiment, a computing environment 110 includes a plurality of resources, such as resource 112, and a plurality of principals, such as principal 114.

In some embodiments, a resource 112 is a hardware resource, a software based resource, and the like, which is accessible by a principal of the computing environment 110, such as principal 114. In an embodiment, a resource 112 is, for example, a virtual machine (VM), a software container, a serverless function, an application, a combination thereof, and the like.

For example, according to an embodiment, a VM is implemented as an Oracle® VirtualBox®, a software container is implemented utilizing a Docker® Platform, a Kubernetes® platform, and the like, and a serverless function is implemented as an Amazon® Lambda function.

In certain embodiments, a principal 114 is an entity of the computing environment 110 which is configured to access a resource 112, initiate operations in the computing environment 110, access components and elements of the computing environment 110, a combination thereof, and the like. For example, in an embodiment, a principal 114 is, for example, a service account, a user account, an administrator account, a user group, a local account, a network account, a combination thereof, and the like.

According to an embodiment, the computing environment 110 is a networked computing environment, a cloud computing environment, a hybrid computing environment, an on-prem computing environment, a combination thereof, and the like. In an embodiment, a cloud computing environment includes a virtual private cloud (VPC), a virtual network (VNet), a combination thereof, and the like. In certain embodiments, the computing environment 110 includes a virtual private network (VPN). In an embodiment, a resource 112 is associated with a VPC, a VNet, a VPN, a combination thereof, and the like.

In some embodiments, a cloud computing environment is deployed on a cloud computing infrastructure. For example, according to an embodiment, a cloud computing infrastructure is Amazon® Web Services (AWS), Google® Cloud Platform (GCP), Microsoft® Azure, and the like.

In an embodiment, events that occur in the computing environment 110 are stored as data records, for example, as a record in an event log 116. In some embodiments, the event log is implemented using Amazon® CloudTrail, for example. In an embodiment, a serverless function is configured to monitor a resource in the computing environment 110 and write an event to a CloudTrail bucket. A bucket is a cloud computing storage mechanism.

In certain embodiments, an event log 116 includes a plurality of data records, each data record corresponding to an event in the computing environment 110. For example, according to some embodiments, an event is a communication between a first resource and a second resource, an access of a resource by a principal, generation of a principal, a combination thereof, and the like.

In an embodiment, the computing environment 110 is monitored by an inspection environment 120. According to an embodiment, the inspection environment 120 is implemented as a computing environment, such as a cloud computing environment. In some embodiments, a portion of the inspection environment 120 is deployed in the computing environment 110.

In certain embodiments, the inspection environment 120 includes an inspection controller 122, an inspector 124, and a security database 126. In an embodiment, the inspection controller 122 is configured to select entities, such as resources, in the computing environment 110 for inspection. In some embodiments, the inspection controller 122 is configured to detect a resource in the computing environment 110 that includes a disk. In an embodiment, the disk is a data disk, an Operating System (OS) disk, a combination thereof, and the like.

According to some embodiments, an inspection controller 122 is configured to generate an inspectable disk 118. In an embodiment, the inspection controller 122 is configured to generate an inspectable disk 118 by cloning, snapshotting, copying, and the like, the detected disk.

In an embodiment, a cloned disk includes a disk pointer pointing to an address in a computing storage system. In some embodiments, the address is an address utilized by the original disk, such that a disk pointer of the original disk and a disk address of the cloned disk point to the same address.

In certain embodiments, a snapshot is a full copy in time of a cloned disk. In some embodiments, it is less advantageous to utilize a snapshot than a clone, as a snapshot is not available instantaneously, while a clone is, as the cloned disk includes a pointer that points to the address of the original disk.

In an embodiment, the inspection controller 122 is configured to initiate an instance of an inspector 124. In certain embodiments, an inspector 124 is configured to inspect a resource, such as the inspectable disk 118 for a cybersecurity object.

According to an embodiment, a cybersecurity object indicates a cybersecurity issue. In an embodiment, a cybersecurity object is a code object, a file, a filesystem, an application, an operating system, an identifier thereof, a software library, a software binary, a malware, a password, a certificate, a cryptographic key, a token, a combination thereof, and the like.

In some embodiments, a plurality of cybersecurity objects indicate together a cybersecurity issue. For example, in an embodiment, a software library (version thereof, and the like) indicates a misconfiguration. In an embodiment, the software library and a stored certificate together indicate a cybersecurity risk.

In certain embodiments, a cybersecurity risk includes a vulnerability, an exposure, a misconfiguration, a toxic combination, a combination thereof, and the like. In some embodiments, an inspection controller 122 is configured to initiate a remediation action in the computing environment 110 in response to detecting a cybersecurity risk.

In an embodiment, a security database 126 is configured to store a representation of the computing environment 110. According to some embodiments, the security database 126 is implemented as a graph database, for example, utilizing Neo4j®. In certain embodiments, the security database 126 includes a data schema which is a unified data schema.

In some embodiments, a unified data schema is utilized to represent entities from different computing environments, such that a virtual machine from a first computing environment (e.g., AWS) is represented using the same schema as a virtual machine from a second computing environment (e.g., GCP).

In an embodiment, the security database 126 is configured to store the representation of the computing environment 110 based on a result from the inspector 124, an enrichment generated by the inspection controller 122, a combination thereof, and the like.

In certain embodiments, the security database 126 is configured to store a representation of the computing environment 110 including a representation of an entity of the computing environment 110, an enrichment, an application endpoint, a resource, a principal, a cybersecurity object, a cybersecurity issue, a remediation action, a combination thereof, and the like.

For example, according to some embodiments, the security database 126 is a graph database, where nodes of the graph represent enrichments, endpoints, resources, principals, etc. An example of such a security graph is discussed in more detail with respect to FIG. 2 below.

In certain embodiments, an inspection controller 122 is configured to generate a forensic finding. In an embodiment, a forensic finding is generated based on a cybersecurity object, a data record from an event log, a combination thereof, and the like. In an embodiment, a forensic finding indicates a cybersecurity issue was exploited.

Figure 2:
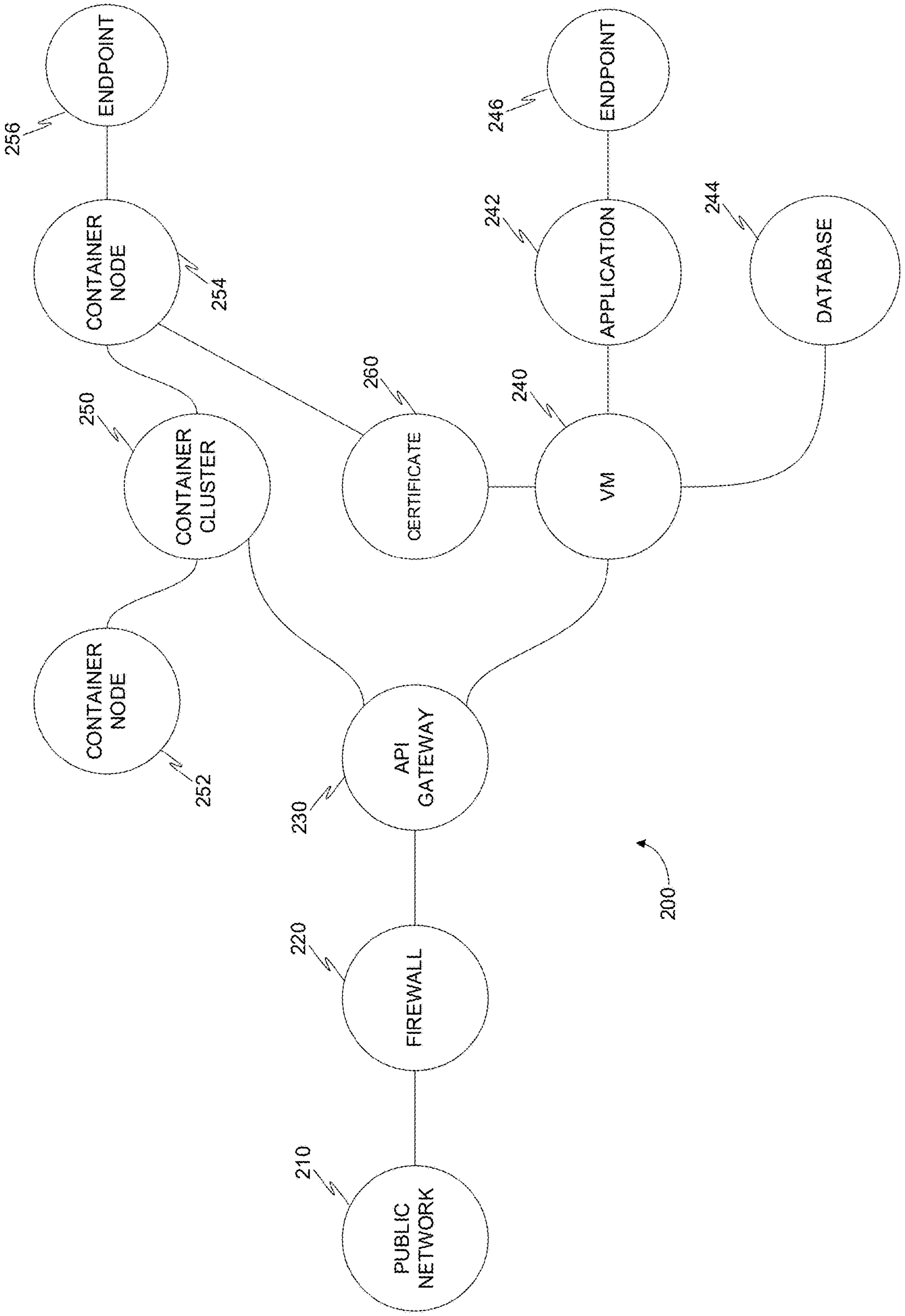
FIG. 2 is an example security graph portion, implemented in accordance with an embodiment.

FIG. 2 is an example security graph portion, implemented in accordance with an embodiment. In an embodiment, the security graph 200 includes a plurality of nodes, each node connected to at least another node by an edge. In certain embodiments, a pair of nodes are connected by a plurality of edges. In some embodiments, each edge indicates a type of connection between the nodes. For example, an edge indicates a "can access", to indicate that a cloud entity represented by a first node is configured to access the cloud entity represented by a second node, according to an embodiment.

A first enrichment node 210 (also referred to as public network node 210) represents a public network. An enrichment node, such as enrichment node 210, is a node generated based on insights determined from data collected from a computing environment, such as the computing environment 110 of FIG. 1 above. In an embodiment, a detected network is enriched with data, for example, to indicate that the network is a public network, is accessible from a public network, etc.

According to an embodiment, an enrichment node represents, for example, a vulnerability. By connecting resource nodes in the graph to the enrichment node representing a vulnerability, the security graph 200 indicates that the resources contain the vulnerability. This allows a compact representation as the security graph does not redundantly store multiple data fields of the same vulnerability in each resource node, which each represent a resource with the vulnerability.

In an embodiment, the public network node 210 is connected to a first resource node 220 (also referred to as firewall node 220) representing a firewall workload. The firewall represented by the firewall node 220 is implemented, in an embodiment, as a virtual machine in a cloud computing environment. Connecting the public network node 210 to the firewall node 220 represents that the firewall is open to transceiving communication from itself and the public network.

The firewall node 220 is further connected to a second resource node 230 (also referred to as API gateway node 230) which represents an API (application programming interface) gateway, in an embodiment. In some embodiments, an API gateway is a workload, for example, a serverless function, which acts as a reverse proxy between a client and resources, accepting API calls, directing them to the appropriate service, workload, resource, etc. and returning a result to the client when appropriate.

The API gateway node 230 is connected to a third principal node 240 (also referred to as VM node 240) representing a virtual machine hosting an application and a database, and the API gateway node 230 is also connected to a fourth principal node 250 (also referred to as container cluster node 250) which hosts a plurality of container nodes.

In an embodiment, the VM node 240 is connected to an application node 242, and a database node 244. The application node 242 may indicate, for example, that a certain application, having a version number, binaries, files, libraries, and the like, is executed on the VM which is represented by the VM node 240. In an embodiment, the application node 242 is connected to an application endpoint node 246, indicating that the application includes an application endpoint, which potentially exposes the VM represented by VM node 240 to an external network.

In an embodiment, the VM node 240 is connected to a plurality of application nodes. According to an embodiment, the database node 244 represents a database which is stored on the VM (represented by VM node 240), or stored on a storage accessible by the VM. The database node 244 includes attributes which define a database, such as type (graph, columnar, distributed, etc.), version number, query language, access policy, and the like, in an embodiment.

In some embodiments, the container cluster includes a plurality of container nodes, which are represented for example, by first container node 252 and second container node 254. In an embodiment, the second container node 254 includes an application endpoint, represented by an application endpoint node 256.

In an embodiment, a lateral movement is possible between the virtual machine represented by VM node 240 and the container cluster node represented by second container node 254. This is indicated by a certificate node 260 representing a certificate which allows access to both the virtual machine and the software container node.

For example, in an embodiment, gaining access to the virtual machine represented by VM node 240 allows gaining access to the certificate represented by certificate node 260. Thus, lateral movement is possible from one resource to another. In a certain embodiment, the security graph is further configured to store accessibility paths to a resource.

In some embodiments, an accessibility path includes a plurality of reachability parameters. In an embodiment, a reachability parameter includes a network path, an Internet Protocol (IP) address, a port, a network name, a combination thereof, and the like.

In certain embodiments, a forensic finding is detected, for example by an inspector, on a resource such as the virtual machine represented by the VM node 240. In an embodiment, a forensic finding is generated based on a detected artifact, which is detected, for example, on a disk of the virtual machine. In certain embodiments, the forensic finding is represented as a node in the security graph.

Figure 3:
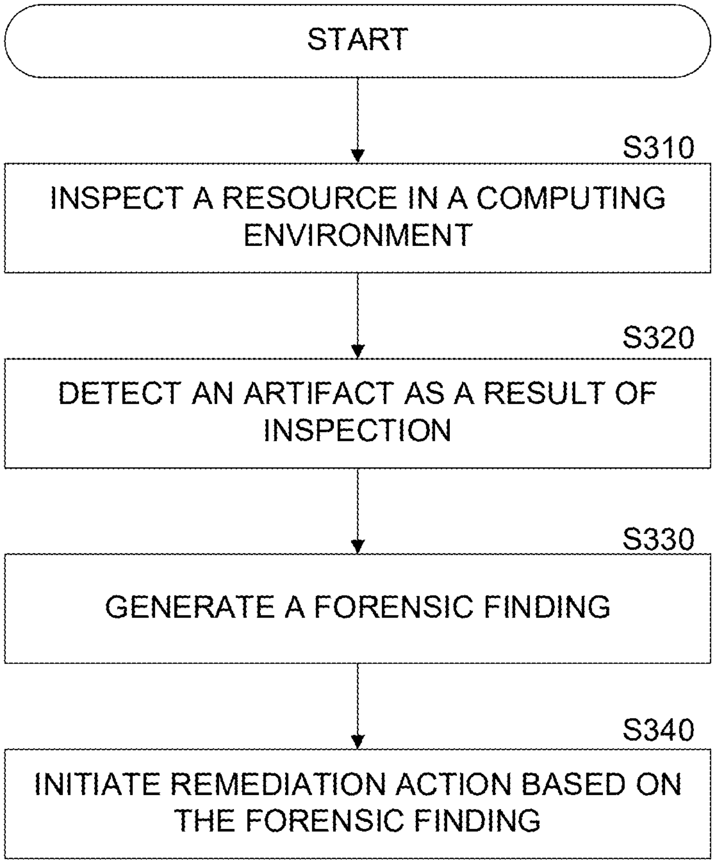
FIG. 3 is a flowchart of a method for generating a forensic finding for a computing environment, implemented in accordance with an embodiment.

FIG. 3 is a flowchart of a method for generating a forensic finding for a computing environment, implemented in accordance with an embodiment. According to an embodiment, a forensic finding is an indication that an entity, such as a resource, has been exploited.

At S310, a resource is inspected. In an embodiment, inspecting a resource includes detecting a resource in a computing environment, for example, by querying an API of the computing environment to perform network discovery. In an embodiment, querying an API, for example, of a cloud computing environment, provides an inspection controller with identifiers of a plurality of resources.

In an embodiment, the inspection controller is configured to provision an inspector, a plurality of inspectors, etc., to inspect the resource for a cybersecurity object. In some embodiments, the cybersecurity object is a forensic artifact. In certain embodiments, a forensic artifact indicates that a resource was exploited. For example, in an embodiment, a user account is generated with a permission, and a record indicating this is stored on the resource which is utilized to generate the account.

At S320, an artifact is detected. In an embodiment, an artifact is detected utilizing an inspector. For example, in an embodiment, an artifact is a cybersecurity object that an inspector is configured to detect.

In certain embodiments, a forensic artifact is a data record in a log file, for example, including timestamped records of user authentication attempts. In an embodiment, a log file record includes a source Internet Protocol (IP) address, a username, success of a login attempt, failure of a login attempt, a combination thereof, and the like.

At S330, a forensic finding is generated. In some embodiments, a forensic finding is generated based on a detected forensic artifact, a plurality of detected forensic artifacts, and the like. In an embodiment, a forensic finding is represented on a security graph, for example, as discussed in more detail herein.

In some embodiments, a forensic finding is represented as a node in a security graph. In certain embodiments, a forensic finding is represented as an edge in the security graph. For example, in an embodiment, a portion of the forensic finding, such as the forensic artifact, is represented as an edge on the security graph. In some embodiments, a first resource node is connected to a second resource node via an edge which indicates that the first resource accessed the second resource. As another example, in an embodiment, the edge indicates that the first resource attempted to access the second resource multiple times.

At S340, a remediation action is initiated. In an embodiment, the remediation action is initiated based on the forensic finding. In some embodiments, the remediation action is represented in the security database, for example, as a node in a security graph. In certain embodiments, a forensic finding type is represented by a node which in turn is connected to a node representing a remediation action, which is based on the type of forensic finding.

In certain embodiments, a remediation action includes revoking a permission from a principal, revoking access to a resource, revoking access from a resource, sandboxing a resource, quarantining a resource, quarantining an application, generating an alert, generating a ticket in a ticketing system, initiating a remediation script, initiating a mitigation action, a combination thereof, and the like.

In some embodiments, the remediation action is initiated on a resource which relates to the forensic finding (e.g., on which an artifact is detected). In certain embodiments, the remediation action is initiated with respect to another resource, another principal, and the like, which is connected in the security database to the representation of the resource, principal, and the like, on which a forensic artifact is detected.

Figure 4:
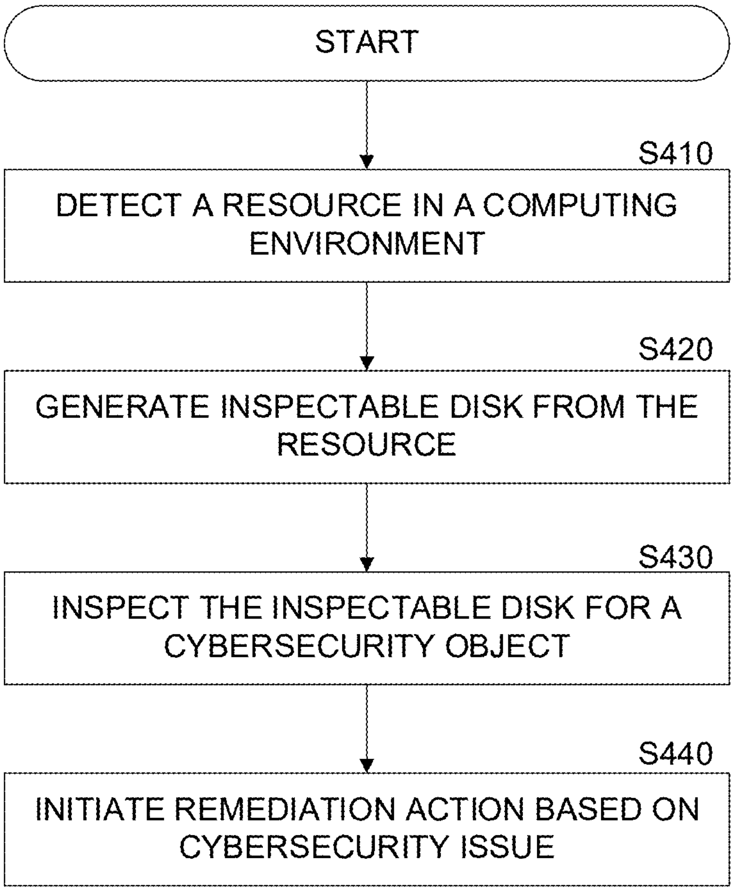
FIG. 4 is a flowchart of a method for inspecting an entity of a computing environment for a cybersecurity issue, implemented according to an embodiment.

FIG. 4 is a flowchart of a method for inspecting an entity of a computing environment for a cybersecurity issue, implemented according to an embodiment. According to an embodiment, a cybersecurity issue includes a cybersecurity risk, such as a misconfiguration, an exposure, a vulnerability, a malware, a combination thereof, and the like.

At S410, a resource is detected in a computing environment. In an embodiment, detecting a resource in a computing environment includes querying an API of a computing environment, such as a cloud computing environment. In certain embodiments, a result of the API query includes a plurality of identifiers of resources in the computing environment. In some embodiments, the result of the API query includes a plurality of identifiers of principals in the computing environment.

In an embodiment, a resource is detected that includes a disk. For example, in an embodiment, the resource is a virtual machine, a software container, a combination thereof, and the like. In certain embodiments, a disk includes a disk descriptor which has an address to a storage, such as a cloud computing storage system.

At S420, an inspectable disk is generated. In an embodiment, the inspectable disk is generated based on the detected disk of the resource. For example, in an embodiment, the original disk is cloned by generating a cloned disk. In an embodiment, the cloned disk includes a disk descriptor which points to the storage address of the original disk.

In certain embodiments, the disk descriptor, any other resource, and the like, which are provisioned to the cloned disk, are released in response to completing inspection. In an embodiment, the inspectable disk is inspected for a cybersecurity object.

At S430, the inspectable disk is inspected for a cybersecurity object. In an embodiment, the cybersecurity object is a code object, a file, a filesystem, an application, an operating system, an identifier thereof, a software library, a software binary, a malware, a password, a certificate, a cryptographic key, a token, a combination thereof, and the like.

According to an embodiment, the cybersecurity object is represented on the security database, for example, as a node in a security graph. In some embodiments, a representation of the cybersecurity object is connected to a representation of a resource on which the cybersecurity object is detected.

In an embodiment, an inspector is configured to inspect the inspectable disk for the cybersecurity object. In some embodiments, a plurality of inspectors are configured, each to inspect the inspectable disk for a cybersecurity object (i.e., each inspector inspects for different objects).

At S440, a remediation action is initiated. In some embodiments, a mitigation action is initiated. In an embodiment, the remediation action is initiated in response to detecting a cybersecurity object. In certain embodiments, the cybersecurity object indicates a cybersecurity issue.

In an embodiment, a toxic combination is detected based on detecting a plurality of cybersecurity objects, which together form a toxic combination. For example, in an embodiment, detecting an exposed resource which has stored thereon a key which provides access to another resource is a toxic combination, as each of the detected issues is less significant individually than the combination of issues as a whole.

Figure 5:
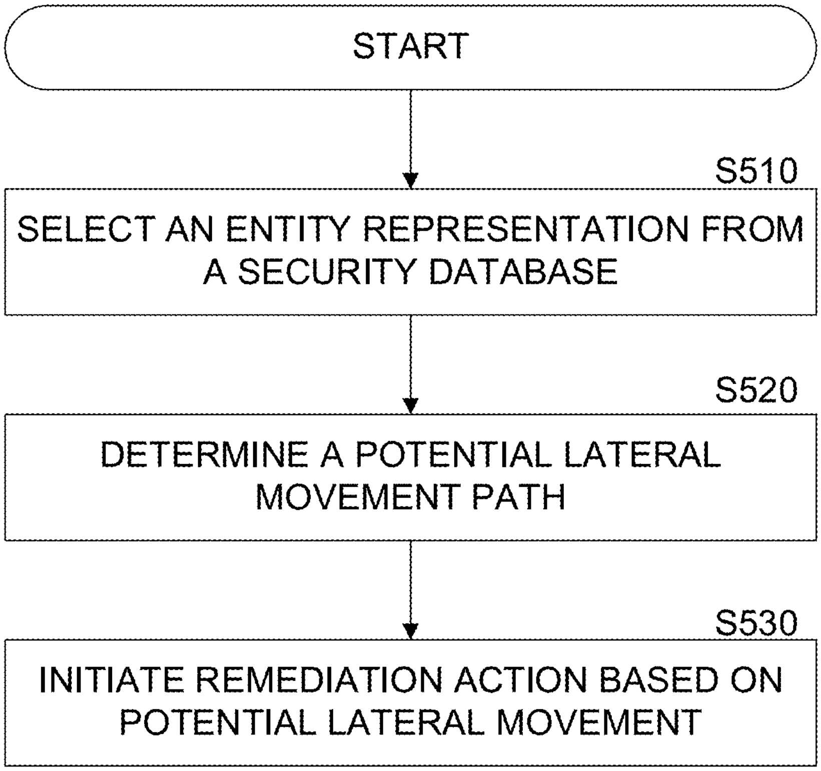
FIG. 5 is a flowchart for detecting potential lateral movement paths in a networked computing environment, implemented in accordance with an embodiment.

FIG. 5 is a flowchart for detecting potential lateral movement paths in a networked computing environment, implemented in accordance with an embodiment. In an embodiment, a potential lateral movement path is detected utilizing a security database, such as the security graph discussed in more detail in FIG. 2 above.

At S510, a representation is selected in a security database. In an embodiment, the representation is a representation of a resource, a principal, and the like. In some embodiments, the security database is a graph database. In an embodiment, entities, enrichments, and the like, are represented in a graph database as nodes in the graph.

In an embodiment, the representation is connected to a representation of a cybersecurity object. In some embodiments, the cybersecurity object provides access to another resource, another principal, etc. For example, according to certain embodiments, the cybersecurity object is a password, a cryptographic key, a cloud key, a Secure Shell (SSH) key, a certificate, a token, a combination thereof, and the like.

In an embodiment, access to the cybersecurity object provides potential access to other resources, principals, and the like. For example, in an embodiment, a token allows a first principal having a first permission set to assume a role, a second principal, and the like, having a second permission set which includes a permission which is not included the first permission set, thereby leading to a permission escalation event.

At S520, a potential lateral movement path is determined. In an embodiment, a potential lateral movement path is determined by traversing a security graph from the selected representation to a representation of a cybersecurity object, and from the cybersecurity object to a representation of another resource, another principal, and the like.

In some embodiments, a potential lateral movement path includes a plurality of cybersecurity objects. In an embodiment, a hop is defined as a path which includes a first resource node, a first cybersecurity object, and a second resource node, such that the first resource node and the second resource node are both connected to the first cybersecurity object.

In certain embodiments, a potential lateral movement path includes a plurality of hops. For example, in an embodiment, a potential lateral movement path includes two hops, such that the path includes a first resource node, a first cybersecurity object, a second resource node, a second cybersecurity object, and third resource node, so that the first resource node and the second resource node are connected to the first cybersecurity object, and the second resource node and the third resource node are both connected to the third resource node.

At S530, a remediation action is initiated. In an embodiment, a remediation action is generated for each potential lateral movement path of a plurality of lateral movement paths. According to some embodiments, a remediation action includes generating an alert, updating a severity of an alert, generating a ticket in a ticketing system, initiating a mitigation action, initiating inspection of a resource, a combination thereof, and the like.

For example, according to an embodiment, a remediation action includes initiating inspection of a resource on which a cybersecurity object is detected which allows access to another resource. In an embodiment, where a cybersecurity issue is detected on the resource, a remediation action, a mitigation action, and the like, are initiated on the resource in response to such detection.

Figure 6:
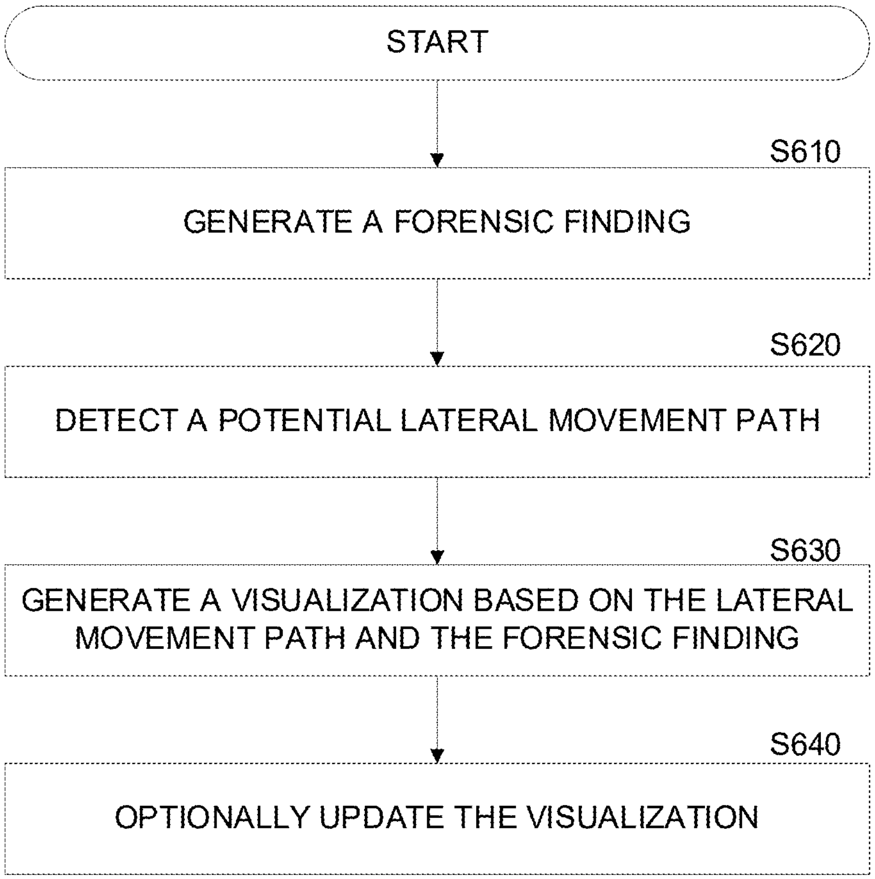
FIG. 6 is a flowchart of a method for generating a visualization of a cybersecurity incident, implemented in accordance with an embodiment.

FIG. 6 is a flowchart of a method for generating a visualization of a cybersecurity incident, implemented in accordance with an embodiment. In some embodiments, a cybersecurity incident includes a forensic finding indicating that an exposure, a vulnerability, and the like, were exploited.

At S610, a forensic finding is generated. In an embodiment, a forensic finding is generated based on a forensic artifact. A method for generating a forensic finding and detecting a forensic artifact are discussed in more detail herein.

According to some embodiments, a forensic artifact includes a log entry, a data record, a detected file, a detected record, a combination thereof, and the like. In certain embodiments, a truncated forensic record is generated. In some embodiments, a truncated forensic record is generated based on a forensic artifact, a forensic finding, a combination thereof, and the like. In an embodiment, a truncated forensic finding is advantageous as it is shorter to display than a full data record.

In some embodiments, generating a truncated forensic record includes parsing a data record of a log, extracting values corresponding to predetermined data fields which are detected in the data record, and generating the truncated forensic record based on the extracted values and a template of a truncated forensic record.

At S620, a potential lateral movement path is detected. In an embodiment, an identifier of a resource, an identifier of a principal, and the like, is detected in the forensic finding. In some embodiments, a security graph is traversed to detect a node that corresponds to the detected identifier. In an embodiment, the security graph is further traversed to detect the potential lateral movement path based on detecting a node corresponding to the detected identifier.

In an embodiment, the potential lateral movement path includes a single hop, a plurality of hops, etc. In certain embodiments, a plurality of potential lateral movement paths are detected. For example, in an embodiment, a first potential lateral movement path originates from a first resource, and includes one hop (i.e., to a resource, a principal, and the like, which is one hop away from the first resource).

In certain embodiments, a second potential lateral movement path originates from the first resource and includes a resource, a principal, and the like, which are a plurality of hops from the first resource. In some embodiments, the number of plurality of hops (i.e., the number of hops) is predefined.

In an embodiment, a user interface is configured to receive an input which when received configures the user interface to display another lateral movement path, a lateral movement path with an increased number of hops, a lateral movement path with a decreased number of paths, a combination thereof, and the like.

At S630, a visualization is generated. In an embodiment, a visualization is generated based on the detected forensic finding. In some embodiments, a detected forensic finding is associated with an identifier of an entity of a computing environment. For example, in an embodiment, the identifier is an identifier of a resource, a principal, and the like.

In certain embodiments, the identifier is utilized in querying a security database. In an embodiment, the generated visualization is generated as a graph, graph including a plurality of nodes, a portion of which represent resources of the computing environment and a portion of which represent principals of the computing environment.

In an embodiment, the graph of the visualization further includes nodes which each represent a cybersecurity object. In an embodiment, the visualization further includes generating a visual component of an edge connecting a plurality of nodes. In some embodiments, the edge visual component includes a textual component. In an embodiment, the textual component corresponds to a truncated forensic record.

According to an embodiment, the visualization further includes runtime data received from a sensor deployed on a resource. In some embodiments, data received from the sensor is received by an inspection environment, where an inspection controller is configured to store such data in the security database. In an embodiment, the runtime data, processed runtime data, and the like, is displayed in proximity to a visual representation of a resource, principal, and the like, to which the runtime data pertains.

In some embodiments, the visualization includes enrichment nodes. In an embodiment, an enrichment node represents an external IP address, a domain name, an action, a context, a process, a subscription, a service, a combination thereof, and the like.

At optional S640, the visualization is updated. In an embodiment, the visualization is updated based on an input received, for example from a graphical user interface on which the visualization is displayed. In some embodiments, updating the visualization includes generating a lateral movement path, increasing a number of hops of a lateral movement path, decreasing a number of hops of a lateral movement path, adding an enrichment node to the visualization, adding an edge to the visualization, adding a forensic finding to the visualization, adding a context to the visualization, adding an action to the visualization, a combination thereof, and the like.

In some embodiments, an action, an enrichment, a forensic finding, a context, and the like, are detected for example in a log of a computing environment. In certain embodiments, the log includes data records which are parsed and searched for a keyword, data field, and the like, which indicate the action, forensic artifact, context, etc.

Figure 7:
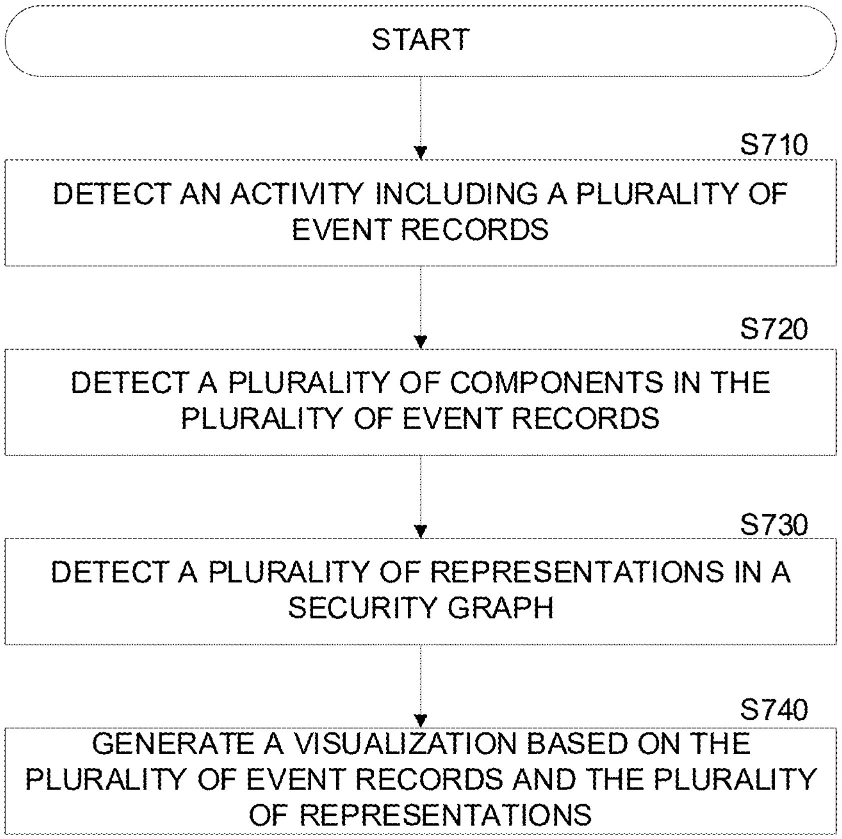
FIG. 7 is an example flowchart of a method for generating a visualization of an activity graph for cybersecurity threat detection, implemented in accordance with an embodiment.

FIG. 7 is an example flowchart of a method for generating a visualization of an activity graph for cybersecurity threat detection, implemented in accordance with an embodiment. It is advantageous to utilize an activity graph for cybersecurity threat detection because it provides a visualization of entity interactions in the computing environment. This visualization is beneficial as it allows for the identification of potential attack paths, anomalous behavior, and unusual patterns of data access within the environment.

At S710, an activity is detected in a computing environment. In an embodiment, an activity is an event, an action, a task, and the like, that has occurred within the computing environment. In certain embodiments, an activity is a plurality of events, a plurality of actions, a plurality of tasks that has occurred within computing environment. In some embodiments, an activity includes a plurality of events, event records, a combination thereof, and the like.

In an embodiment, an event record is a digital record of an event received from a runtime sensor. In various embodiments, an event is a data record indicating a change in the state of a system, network, operating system, a combination thereof, and the like. In an embodiment, the runtime sensor is configured to be deployed on components of a computing environment. In certain embodiments, an event record is generated based on extracted data from the runtime sensor.

In some embodiments, the runtime sensor is configured to track network traffic in real time. In an embodiment, network traffic is data (e.g. data packets) passing through a network or computing environment at a particular point in time. In an embodiment, the runtime sensor is configured to track processes running on a component, system, physical machine, hardware device, and the like, of the computing environment. In certain embodiments, the runtime sensor is configured to perform real-time tracing of system calls, monitor resource (e.g., processor, memory, storage, network bandwidth, etc.) usage, a combination thereof, and the like.

In some embodiments, an event log, a cloud log, a network log, a runtime data log, an enriched event log, and the like, is configured to store, events, event records, runtime events, cloud events, network events, a combination thereof, and the like. In an embodiment, the event log is inspected for event sequences, correlatable events, and a combination thereof, in order to detect an activity.

In some embodiments, an event sequence is a series of events that occur in a chronological order and indicate a specific activity. For example, in an embodiment, an event sequence indicating the activity of creating a user account includes the chronological events of first, accessing a user management account system; second, defining the user account information; and third setting up the user credentials.

In certain embodiments, correlatable events include events that share a common resource identifier, user account identifier, source Internet Protocol (IP) address, destination (Internet Protocol) address, a combination thereof, and the like. For example, in an embodiment, correlatable events indicating the activity of a file creation include the initiation of a file request, the opening of the file, uploading data to the file, and closing the file.

In various embodiments, events are considered correlatable in response to a plurality of events meeting a predefined rule. In an embodiment, for example, a predefined rule is that all identical events within a predetermined time period constitute a correlatable event. For example, in an embodiment, multiple user login attempts from the same user within a one-hour time period constitute correlatable events that indicate the activity of a user attempting to login to a computing resource.

In certain embodiments, an activity indicates a cybersecurity issue. In an embodiment, a cybersecurity issue is detected based on the type of activity, events associated with the activity, principals conducting the activity, a combination thereof, and the like. For example, in an embodiment, a cybersecurity issue is detected from the activity of an unknown file installation on a virtual machine by an unknown user. In various embodiments, a remediation action is initiated in response to a detected cybersecurity issue. In an embodiment, a remediation action includes, revoking access, isolating a system, modifying permissions, disabling compromised accounts, implementing a firewall policy, implementing a software patch, a combination thereof, and the like. In some embodiments, the cybersecurity issue is further detected based on a state of a component.

At S720, a plurality of components are detected. In an embodiment, a plurality of components are detected in a plurality of event records. In various embodiments, a component is a software component (e.g., software application, operating system), a hardware component (e.g., central processing unit, memory), network component (e.g., load balancer), cloud component (e.g., cloud database), a virtualization component (e.g., a software container, a hypervisor), and the like, that is deployed within the computing environment. In an embodiment, a component is a resource or a combination of resources that is utilized to perform a process in the computing environment.

In some embodiments, a runtime sensor is deployed on components of the cloud computing environment. In an embodiment, the runtime sensor is configured to track processes running on a component. In certain embodiments, the runtime sensor is configured to track actions performed by a component and component interactions with other resources of the environment. In an embodiment, the runtime sensor is configured to generate runtime data including data of components, processes running on the components, and component interactions within the computing environment. In various embodiments, event records are generated from runtime data received from the runtime sensor.

In certain embodiments, an event record includes an event, a component utilized to perform the event, a resource which the event occurred on, a timestamp of when the event occurred, a combination thereof, and the like. In some embodiments, an event log, a cloud log, a network log, a runtime data log, an enriched event log, and the like, is configured to store event records, runtime events, cloud events, network events, a combination thereof, and the like. In some embodiments, event records stored in the event log are inspected to detect components of the computing environment.

In an embodiment, runtime data of each event record of an event log is extracted and parsed to detect components associated with an event or activity. For example, in an embodiment, a component of a software application is detected from an event record including an event of a software installation on a resource of a virtual machine on the date of Dec. 10, 2024, at the time of 2:40:00 μm.

At S730, a plurality of representations are detected in a security database. In an embodiment, a security database includes a representation of a computing environment including devices, components, systems, infrastructure, a combination thereof, and the like, of the computing environment. In various embodiments, the security database is implemented as a security graph which provides a representation of the relationships, dependencies, and interactions between the devices, components, systems, infrastructure, and the like, within the computing environment.

In an embodiment, a security graph identifies the flow of data, access controls, security controls, and potential attack paths across systems, devices, components, infrastructure, and the like, of the computing environment. In some embodiments, a security graph is visually depicted with nodes, edges, a combination thereof, and the like. In an embodiment, a node represents an entity such as a component, device, user account, server, potential vulnerabilities, potential cybersecurity attacks, a combination thereof, and the like. In an embodiment, an edge represents connections between the different nodes, the flow of data, potential attack paths, and the like.

In an embodiment, a security database, a graph database, and the like, is configured to store a security graph including its representations. In various embodiments, representations of a security graph are detected from querying the security graph. In an embodiment, a query language is utilized to query the security graph, such as Cypher®, Gremlin, GraphQL®, and the like. For example, in an embodiment, a security graph is queried for a representation of a virtual machine component of the computing environment.

In some embodiments, representations of a security graph are detected from querying a graph database, a security database, and the like. For example, in an embodiment, a graph database is queried for a relationship between two components, such as an Application Programming Interface (API) gateway and a virtual machine.

At S740, a visualization is generated based on the plurality of event records and representations. In an embodiment, a visualization is a visual representation of an activity, event, sequence of events, representation of a security graph, plurality of representations of security graphs, a combination thereof, and the like, of the computing environment. In various embodiments, the visualization provides a visual representation of the relationships, dependencies, and interactions between the devices, components, systems, infrastructure, and the like, of a specific activity, event, sequence of events, representation, and the like of the computing environment.

In an embodiment, a visualization identifies the flow of data, access controls, security controls, and potential attack paths across systems, devices, components, infrastructure, and the like, for a specific activity, event, representation, plurality of representations, and the like, of the computing environment. In some embodiments, the visualization depicts an activity, an event, a representation, a plurality of representations, and the like, utilizing nodes, edges, a combination thereof, and the like. In an embodiment, a node represents an entity such as a component, device, user account, server, potential vulnerabilities, potential cybersecurity attacks, a combination thereof, and the like. In an embodiment, an edge represents connections between the different nodes, activities, events, sequence of events, the flow of data, potential attack paths, and the like.

In various embodiments, the visualization is generated based on extracted data from event records including events, activities, a combination thereof, and the like. In an embodiment, the visualization is generated based on extracted data of a security graph including its representations stored in a graph database, security database, and the like.

In some embodiments, the extracted data is parsed to identify entities of the computing environment, such as components, devices, user accounts, potential attacks and vulnerabilities, a combination thereof, and the like. In an embodiment, the extracted data is parsed to identify the relationships between the entities (e.g., components, devices, user accounts) of the computing environment. In various embodiments, the visualization is rendered on a display, user interface, and the like.

In some embodiments, entities are visually depicted as nodes in the visualization. In various embodiments, relationships between the entities are represented as edges between the different entities (e.g., nodes) of the visualization.

In an embodiment, the visualization is an activity graph, which further includes a representation of a remediation action. In some embodiments, the activity graph includes a plurality of remediation actions, wherein each action is applicable to a different component, node, etc., of the activity graph. In an embodiment, a remediation action includes revoking access to a resource, revoking access from a resource, revoking a permission, adding a permission, restoring a file, deleting a file, sandboxing a virtualization, a combination thereof, and the like.

Figure 8:
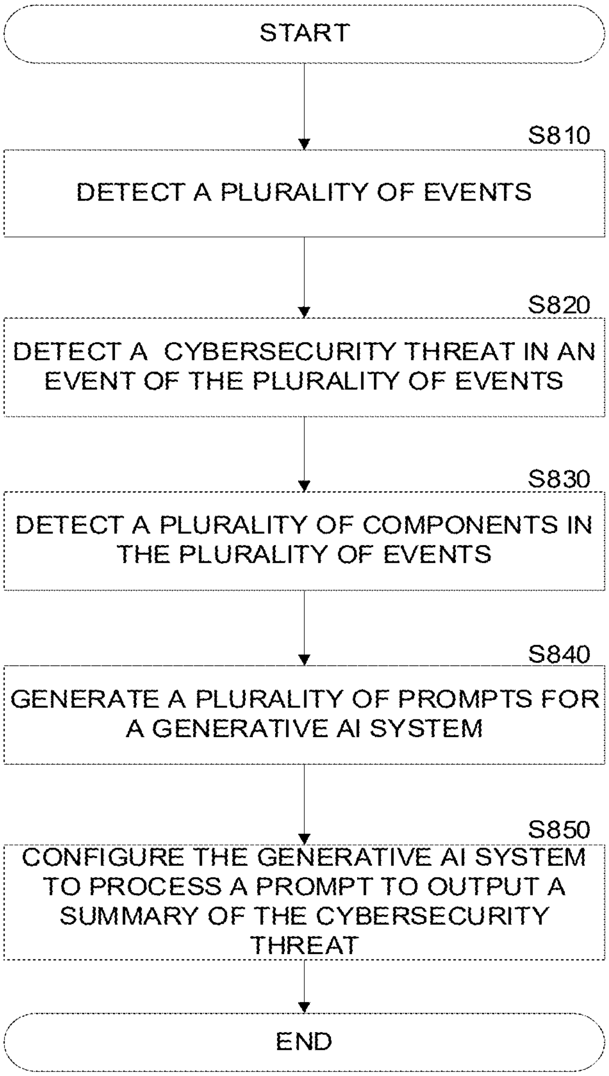
FIG. 8 is an example flowchart of a method for generating an activity graph for cybersecurity threat detection, implemented in accordance with an embodiment.

FIG. 8 is an example flowchart of a method for generating an activity graph for cybersecurity threat detection, implemented in accordance with an embodiment. It is advantageous, in certain embodiments, to utilize a generative Artificial Intelligence (AI) system to generate an activity graph, visualization, summary, timeline, and the like, as it generates a rapid and efficient output based on customizable and selected data.

At S810, a plurality of events is detected. In an embodiment, a plurality of events is detected in a log, a cloud log, an event log, an enriched event log, a network log, a combination thereof, and the like.

In various embodiments, an event is a data record indicating a change in the state of a system, network, operating system, a combination thereof, and the like. In an embodiment, an event is a digital record of an event received from a runtime sensor. In some embodiments, the runtime sensor is configured to be deployed on resources, components, and the like, of a computing environment. In certain embodiments, an event record is generated based on extracted data from the runtime sensor.

In some embodiments, the runtime sensor is configured to track network traffic in real time. In an embodiment, network traffic is data (e.g., data packets) passing through a network or computing environment at a particular point in time. In an embodiment, the runtime sensor is configured to track processes running on a resource, component, system, physical machine, hardware device, and the like, of the computing environment. In certain embodiments, the runtime sensor is configured to perform real-time tracing of system calls, monitor resource (e.g., processor, memory, storage, network bandwidth, etc.) usage, a combination thereof, and the like.

In some embodiments, a log, an event log, a cloud log, a network log, a runtime data log, an enriched event log, and the like, is configured to store events, event records, runtime events, cloud events, network events, a combination thereof, and the like. In an embodiment, an event record includes an event type, a component utilized to perform the event, a resource which the event occurred on, a timestamp of when the event occurred, a combination thereof, and the like. In certain embodiments, a log, an event log, a network log, a runtime data log, an enriched event log, and the like, is inspected for events, event records, runtime events, cloud events, network events, and the like, in order to detect a plurality of events.

At S820, a cybersecurity threat is detected in an event of the plurality of events. In an embodiment, a cybersecurity threat is detected from detected event records stored in the log, cloud log, event log, enriched event log, network log, a combination thereof, and the like. In various embodiments, runtime data is extracted from event records including parameters of event records such as an event type, a component, a resource, a principal, a time stamp, a combination thereof, and the like. In an embodiment, the extracted runtime data of the event record is parsed and utilized to determine a cybersecurity threat for a specific event.

In various embodiments, cybersecurity threats are detected based on event type, number of event occurrences, timing of an event, time period of an event occurrence, type of resource associated with an event, type of component associated with an event, principal associated with an event, a combination thereof, and the like. For example, in an embodiment, a cybersecurity threat is detected in response to an event type of an installation of an unknown software application from an unauthorized user. In an embodiment, for example, a cybersecurity threat is detected in response to multiple event occurrences of three failed login attempts, within a six-minute time period, from an unknown user.

At S830, a plurality of components are detected in the plurality of events. In some embodiments, the events, event records, a combination thereof, and the like, are accessed from a log, cloud log, network log, enriched event log, and the like. In various embodiments, the runtime data of the events, event records, and the like, of which are stored in a log, cloud log, network log, enriched event log, and the like, are extracted.

In an embodiment, the extracted runtime data of the events, event records, and the like, are parsed to detect components, component identifiers, and the like, associated with events, activities, event sequences, cybersecurity threats, vulnerabilities, and the like. In an embodiment, a component includes a principal, a resource, an Internet Protocol (IP) address, a software application, a virtual machine, and the like.

At S840, a prompt is generated for a generative artificial intelligence (AI). In an embodiment, a plurality of prompts is generated for a generative AI system. In various embodiments, a generative AI system is a type of Artificial Intelligence, that utilizes generative models to generate new data content including text, images, timelines, graphs, software code, simulations, videos, and the like. A generative AI system, in some embodiments, includes a Large Language Model (LLM), a Small Language Model (SLM), a Convolutional Neural Network (CNN), an Artificial Neural Network (ANN), a transformer, a Variational Autoencoder (VAE), and the like. For example, in some embodiments, a generative AI system includes an Artificial Intelligence (AI) Model such as Generative Pre-trained Transformer (GPT) 3, Generative Pre-trained (GPT) 4, Decoder-Only Autoregressive Language and Image Synthesis (DALL-E), Microsoft® Copilot, and the like.

In some embodiments, the generative AI system is configured to receive an input. In various embodiments, an input includes a graph, an activity graph, a textual prompt, a textual query, an image, a combination thereof, and the like. In various embodiments, the AI system is configured to process a textual input utilizing tokenization to convert the textual input into a numerical format that an AI Model of the generative AI system is configured to process. In various embodiments, tokenization splits a string of text (e.g., a sentence) into smaller tokens (e.g., words, subwords, characters). For example, in an embodiment, in response to a textual input of "Provide a summary of the detected cybersecurity threat.", the sentence is tokenized into ["Provide a" "summary" "of the" "detected cybersecurity threat"]. In various embodiments, the tokens of the textual input are fed into the AI model of the generative AI system.

Further, in some embodiments, an input of an image undergoes a process of patch-based tokenization which converts the input of a whole image into smaller patch based formats that the AI model is configured to process. In an embodiment, for example, an input of an image including its total pixel amount are divided into groups of square patches of a lesser pixel amount. In an embodiment, these square patches are flattened into a one-dimensional vector and assigned a token value. In some embodiments, these token values are fed to the AI model (e.g., a transformer model).

In various embodiments, the tokenized input is processed through the neural network layers of the AI model to determine the semantic meaning and intent of the input. In certain embodiments, based on the determined semantic meaning, intent of the input, and the like, a plurality of prompts is generated for the generative AI system.

In an embodiment, a plurality of prompts is generated based on using the determined semantic meaning, intent, a combination thereof, and the like, to select a prompt template from a group of predefined prompt templates. In an embodiment, the prompt templates are modified based on the detected cybersecurity threat of an event, event record, activity of the computing environment, and the like, of the computing environment. In some embodiments, the generative AI system is configured to extract data of a detected cybersecurity threat of an event, an event record, an event, an activity, a component, and the like from a security database, database, a log, a cloud log, an event log, a network log, an enriched event log, a combination thereof, and the like, and utilize the data to generate a prompt or a plurality of prompts.

At S850, an event summary is generated. In an embodiment, the generative AI system is configured to process a generated prompt to output a summary of the cybersecurity threat based on a plurality of events. Further, in an embodiment, the generative AI system is configured to process a prompt which outputs the potential impact of a cybersecurity threat on a component, group of components, and the like, of an event, an activity, an event record, and the like. In certain embodiments, the generative AI system is configured to process a prompt including output insights based on a cybersecurity threat, remediation action recommendations based on a cybersecurity threat, a classification of a cybersecurity threat, and the like.

In an embodiment, the AI system is configured to generate an output including a timeline of events, event sequences, activities, detected cybersecurity threats, security breaches, vulnerabilities, a combination thereof, and the like. In some embodiments, the generative AI system is configured to output a visualization of a timeline, activity graph, an image, and the like.

In various embodiments, the AI system is configured to process the generated prompts with extracted data from events, event records, activities, components, cybersecurity threats, and the like, from a security database, a log, a cloud log, an event log, a network log, an enriched event log, a combination thereof, and the like, to provide all textual and visual output responses. In some embodiments, textual and visual output responses of the generative AI system include summaries and insights of cybersecurity threats, summaries of events and activities of the computing environment, recommended remediation actions for cybersecurity threats, timelines of cybersecurity threats, activity graphs, images, and the like.

In some embodiments, a second AI model (e.g., LLM) is utilized to implement a guardrail on the output of the generative AI system. In various embodiments, a guardrail is a policy, a rule, and the like, that is implemented to filter inaccurate, misleading, and inappropriate textual and visual content from being outputted by the generative AI system.

In certain embodiments, the AI system is configured to utilize retrieval augmented generation (RAG). For example, in an embodiment, the AI system is configured to detect component in an event record, such as an identifier of a principal, an identifier of a resource, an event type, etc., and generate a query for a security database. In some embodiments, the security database includes a representation of the computing environment, including enrichments, remediation actions, endpoints, principals, resources, risks, threats, misconfigurations, exposures, various combinations thereof, and the like.

In an embodiment, the AI system is configured to generate a query which when executed by the security database (e.g., security graph) outputs representations, such as nodes, which are connected to a node representing, for example, a resource having an identifier which was extracted from an event record.

According to an embodiment, the output of the security database is utilized by the AI system for performing retrieval augmented generation. In some embodiments, a state of various components is determined, and the state is utilized in a RAG technique.

Figure 9:
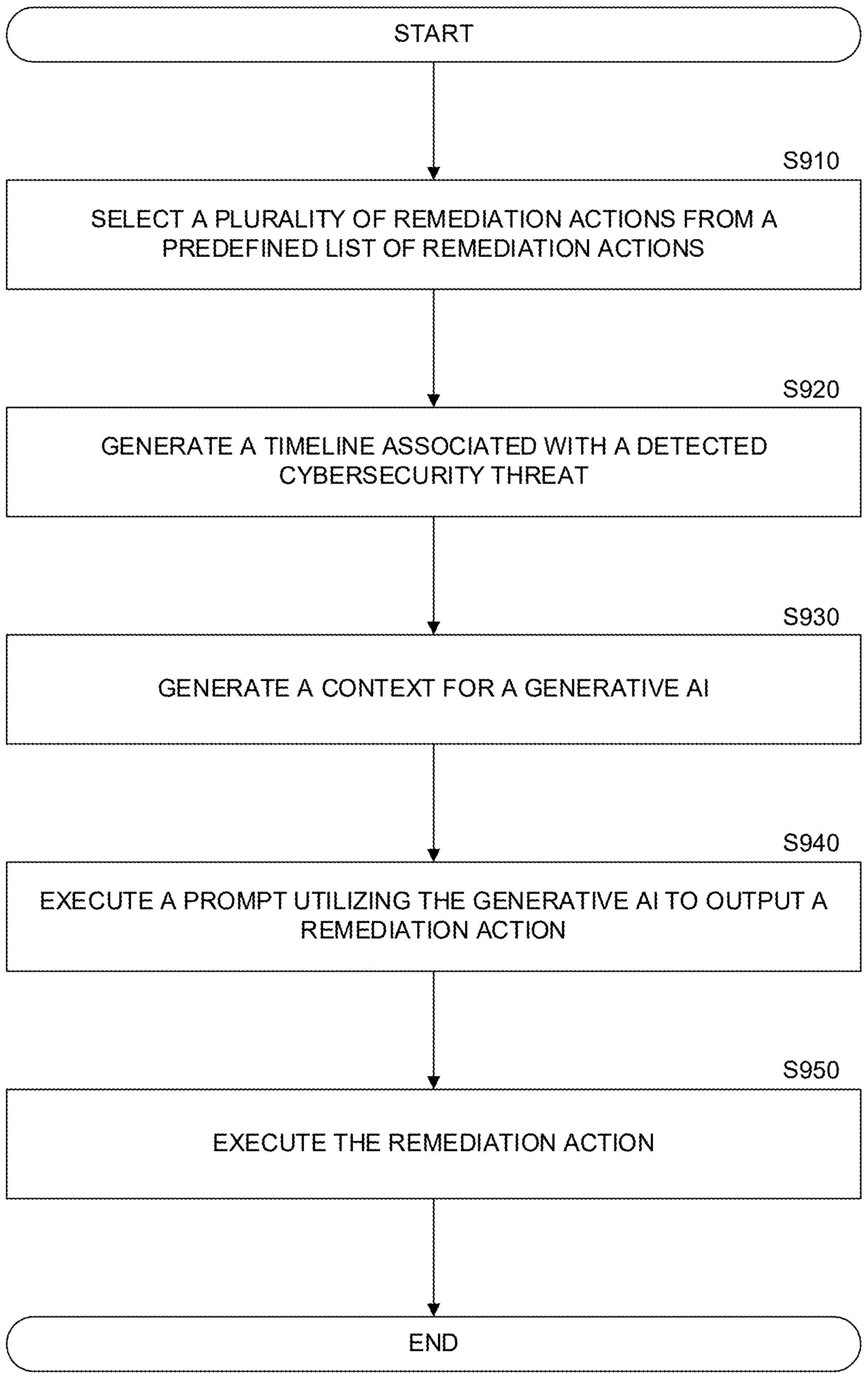
FIG. 9 is an example flowchart of a method for remediating a cybersecurity threat based on timeline generation utilizing generative artificial intelligence, implemented in accordance with an embodiment.

FIG. 9 is an example flowchart of a method for remediating a cybersecurity threat based on timeline generation utilizing generative artificial intelligence, implemented in accordance with an embodiment. Once a threat is detected a timeline allows to detect events which are related to threat, and entities related to the events can be determined. Remediation actions are then generated which can be applied to the specific entities to provide resolution to the cybersecurity threat.

At S910, a plurality of remediation actions is selected. In some embodiments, the remediations actions are selected based on a detected cybersecurity issue. According to an embodiment, a first remediation action is selected for a first computing environment, and a second action is selected for a second computing environment. In an embodiment, a first computing environment is, for example, an IaaS (infrastructure as a service) environment, and a second computing environment is, for example, a PaaS (platform as a service) environment, both associated with a single client, account, and the like. For example, in an embodiment, a first remediation action is a control-plane based remediation action, and a second remediation action is a data-plane based remediation action.

In an embodiment, the remediation actions are selected based on an attack path, such as a lateral movement path. Lateral movement in cybersecurity refers to attackers moving through a network after gaining initial access to a system such as credential theft, exploiting remote administration, exploiting system vulnerabilities, malware, framework exploitations, network exploitation, and the like.

According to an embodiment, each remediation action includes an action generated to address a cybersecurity issue. For example, a remediation action includes, in an embodiment, generating an alert, updating a severity level of an alert, generating a ticket in an issue tracking system, initiating a mitigation action in a computing environment, inspecting a resource, a combination thereof, and the like. In an embodiment, the plurality of remediation actions is selected from a list of predefined remediation actions based on detected cybersecurity threats, event records, suspicious activities in the computing environment, and the like.

In some embodiments, a security database is configured to store a representation of a remediation action, for example, connected to a representation of a cybersecurity issue which is resolved by the connected remediation action. In an embodiment, the security database includes a plurality of remediation actions, including a natural text on how to fix cybersecurity issues. In certain embodiments, a security database is queried based on an identifier of an entity (e.g., a cloud entity) to detect a representation of a remediation action which is connected to a representation of a cybersecurity issue (e.g., a threat, a toxic combination, a misconfiguration, a vulnerability, an exposure, a combination thereof, etc.).

In an embodiment, a remediation action includes a computer instruction which when executed results in revoking access to a resource, revoking access from a resource, revoking a permission, adding a permission, restoring a file, deleting a file, sandboxing a virtualization, a combination thereof, and the like.

At S920, a timeline is generated. In an embodiment, a timeline is generated in response to a detected cybersecurity threat. According to an embodiment, detecting a cybersecurity threat includes collecting event activity from the computing environment. In an embodiment, an event activity is gathered from various sources, including networked computing environments, cloud computing environments, hybrid computing environments, on-premises computing environments, a combination thereof, and the like. In an embodiment, an event source is a sensor deployed on a resource in the computing environment, a cloud log, a network log, a combination thereof, and the like.

In an embodiment, an event record is a digital record of an event detected by a runtime sensor, indicating a potential cybersecurity issue. In an embodiment, detection is based on various factors such as the type of activity, related events, entities (e.g., principals, resources, etc.) identified in the event, a combination thereof, and the like. In an embodiment, the runtime sensor is utilized for detecting runtime events in a virtualization deployed in a computing environment.

In an embodiment, event logs, cloud logs, network logs, runtime data logs, enriched event logs, and the like are used to store event records, runtime events, cloud-related events, network activities, a combination thereof, and the like. In an embodiment, the event log is analyzed by an inspection controller configured to identify patterns to detect specific activities.

In some embodiments, an event log includes a series of events that occur in sequential order which indicates suspicious cybersecurity activity. For example, an event sequence indicating unauthorized access to a computing environment includes the following steps: first, multiple failed logins attempt from different IP addresses; second, a successful login from an unusual location or device; and third, access to sensitive files or system configurations.

In an embodiment, a plurality of entities (e.g., entity identifiers) are detected within a set of event sequences. In an embodiment, event sequences are analyzed to identify potential cybersecurity attacks, such as credential theft, remote administration exploits, system vulnerabilities, malware, exploitation of frameworks, network intrusions, and the like. In other embodiment, relationships and dependencies within a system are detected from a plurality of event sequences and mapped using a security graph. In an embodiment, security graph is utilized to store interactions between users, devices, components, and systems.

In an embodiment, a timeline is a record indicating a plurality of events and an event sequence of their occurrence. In some embodiments, a timeline includes sequences of actions, detected patterns, and the like.

In an embodiment, a timeline is stored in a database configured to store the sequence of events, data flow, access controls, security measures, a combination thereof, and the like. In certain embodiments, a database is configured to store event sequences in chronological order, with details for each event, such as timestamps, event types, related attributes, and the like.

In various embodiments, the database is used to identify and store potential attack paths, providing insight into how a security threat progresses through the computing environment, etc., for example, by correlating related events.

In an embodiment, the timeline is utilized by the generative AI model to generate an inference that includes remediation actions for a cybersecurity attack. The timeline is utilized by the generative AI system as a context for a generative AI model, such as a language model.

At S930, a context is generated for a generative AI. In an embodiment, a context refers to an input that is utilized by an AI model to generate an output, other than the prompt. The context is utilized as the model generates relevant and coherent results based on the situation. In some embodiments, the context is given a first weight, and the prompt is given a second weight which is higher than the first weight.

In an embodiment, a timeline and a threat summary are utilized to generate context for an AI model of a generative AI system. In some embodiments, a timeline is a record indicating a plurality of events and an event sequence of their occurrence. In certain embodiments, a threat summary includes a threat description, threat insight, threat type, pattern detection, and the like. In an embodiment, a threat summary is generated as an event summary, for example as discussed in FIG. 8 above. In an embodiment, the generative AI system is configured to process a generated prompt to output a summary of the cybersecurity threat based on a plurality of events. Further, in an embodiment, the generative AI system is configured to process a prompt which outputs the potential impact of a cybersecurity threat on a component, group of components, and the like, of an event, an activity, an event record, and the like.

In various embodiments, a prompt is an explicit input string, which serves as a query, instruction, command, etc., that initiates output generation. A prompt includes questions, code snippets, structured instructions, and the like, according to an embodiment. In an embodiment, context refers to persistent information and includes prior prompts, responses, and additional information. A context is managed, in an embodiment, utilizing a context window (e.g., the token limit language model can process at once).

In an embodiment, the context is utilized by the generative AI to generate an inference, including remediation actions for a cybersecurity attack. In certain embodiments, the context helps the generative AI model to increase accuracy in generating responses to remediation actions.

At S940, a prompt is generated for a generative AI model. In an embodiment, the prompt, when processed by the generative AI system using the AI model, produces an output that includes a remediation action. In some embodiments, a plurality of remediation actions are generated. In an embodiment, a prompt is generated based on a prompt template.

An example for a prompt template is "Analyze [input] and generate a remediation action to mitigate the detected threat. Include recommended security measures and steps for preventing similar incidents in the future", where [input] is a value which the prompt is adapted to include. For example, in some embodiments, the [input] field is populated with a value from a timeline, a value from an activity graph, a value from a threat summary, a combination thereof, and the like.

According to an embodiment, the prompt, when processed, outputs a remediation action. In an embodiment, a plurality of remediation actions are generated, each directed at a different environment of the computing environment. For example, according to an embodiment, a first remediation action is executable in a first environment (e.g., CI/CD), a second remediation action is executable in a second environment (e.g., runtime environment), a third remediation action is executable in a third environment (e.g., identity layer of the computing environment), a fourth remediation action is executable in a control plane, a fifth remediation action is executable in a data plane, etc., wherein each remediation action addresses the same cybersecurity issue.

At S950, a remediation action is executed. In an embodiment, executing a remediation action includes initiating an action in the computing environment. In some embodiments, a plurality of remediation actions are initiated. In an embodiment, a remediation action includes a plurality of actions, each of which is executed sequentially such that a second action is executed only in response to successfully completing execution of a first action, only in response to receiving a predetermined result of executing the first action, etc.

According to an embodiment, a remediation action includes generating an alert, updating a severity of an alert, revoking access to a resource, revoking access from a resource, revoking a permission from a user account, restoring a backup to a predetermined point in time, a combination thereof, and the like.

In an embodiment, a plurality of remediation actions are initiated, each for a different environment, layer, etc., of the computing environment. For example, in an embodiment, a remediation action is directed to a CI/CD environment, an identity layer, a data layer, a control layer, a VCS environment, a combination thereof, and the like.

Figure 10:
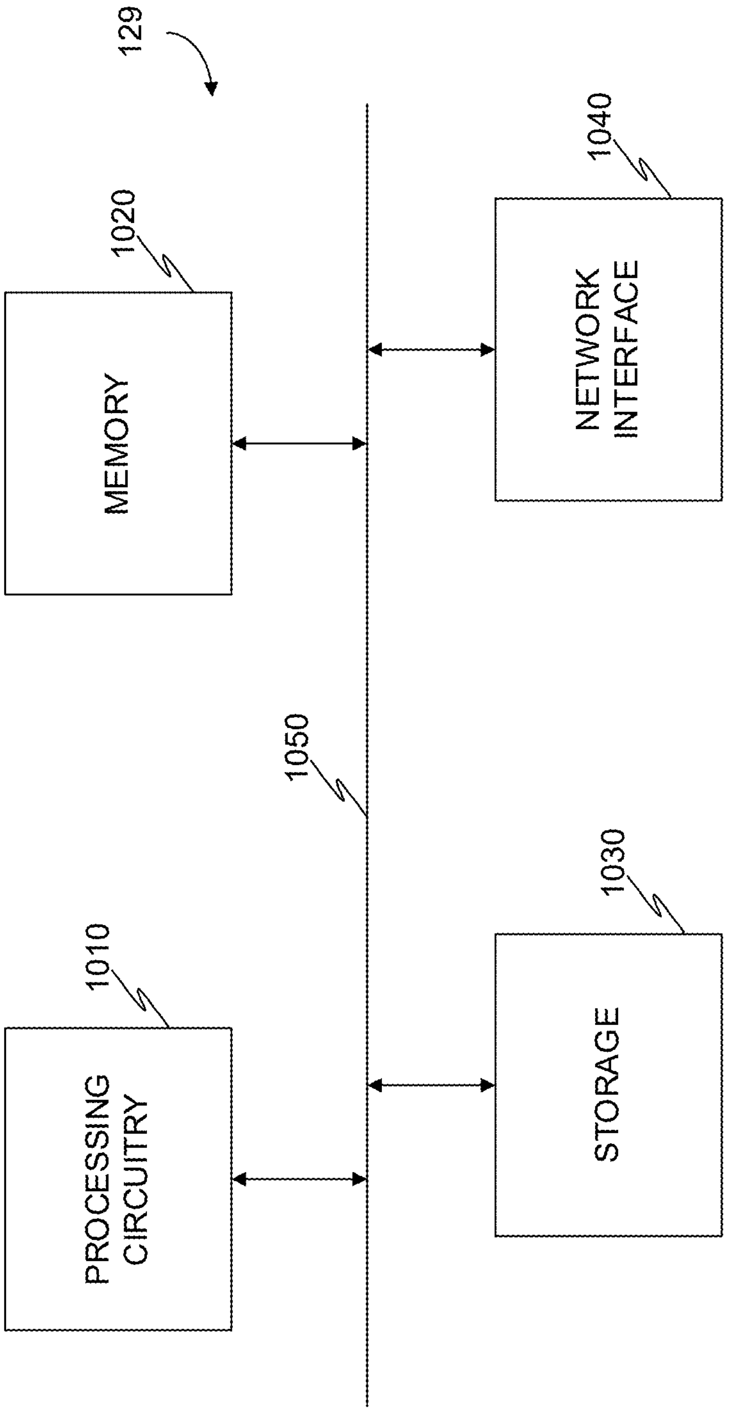
FIG. 10 is an example schematic diagram of an inspection controller according to an embodiment.

FIG. 10 is an example schematic diagram 129 of an inspection controller 122 according to an embodiment. The inspection controller 122 includes, according to an embodiment, a processing circuitry 1010 coupled to a memory 1020, a storage 1030, and a network interface 1040. In an embodiment, the components of the inspection controller 122 are communicatively connected via a bus 1050.

In certain embodiments, the processing circuitry 1010 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 1020 is a volatile memory (e.g., random access memory, etc.), a non-volatile memory (e.g., read-only memory, flash memory, etc.), a combination thereof, and the like. In some embodiments, the memory 1020 is an on-chip memory, an off-chip memory, a combination thereof, and the like. In certain embodiments, the memory 1020 is a scratch-pad memory for the processing circuitry 1010.

In one configuration, software for implementing one or more embodiments disclosed herein is stored in the storage 1030, in the memory 1020, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 1010, cause the processing circuitry 1010 to perform the various processes described herein, in accordance with an embodiment.

In some embodiments, the storage 1030 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 1040 is configured to provide the inspection controller 122 with communication with, for example, the inspector 124, the security database 126, the inspectable disk 118, and the like, according to an embodiment.

It should be understood that the embodiments described herein are not limited to the specific architecture illustrated in FIG. 10, and other architectures may be equally used without departing from the scope of the disclosed embodiments.

Furthermore, in certain embodiments, the inspector 124, security database 126, a combination thereof, and the like, may be implemented with the architecture illustrated in FIG. 10. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a Processing Unite (PU), whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for remediating a cybersecurity threat based on timeline generation utilizing generative artificial intelligence (AI), the method comprising:

detecting the cybersecurity threat in a computing environment, the cybersecurity threat associated with at least an identity;

selecting a group of remediation actions based on the cybersecurity threat, from a predefined plurality of remediation actions, each remediation action executable in one of a plurality of computing environments, the plurality of computing environments including an infrastructure as a service (IaaS) environment and a platform as a service (PaaS) environment;

generating a timeline based on the at least the identity, wherein the timeline includes a plurality of detected events associated with the at least the identity in the computing environment;

generating a context based at least on the timeline, the group of remediation actions, and a threat summary of the cybersecurity threat;

generating a prompt for a generative artificial intelligence (AI) model based on a template, wherein the template is adapted based on one or more events from the timeline;

processing the prompt and the context by utilizing the generative AI model, wherein the prompt is given a different weight than the context, and wherein the prompt, when processed by the generative AI model, outputs a plurality of generated remediation actions, and wherein each generated remediation action of the plurality of the generated remediation actions is directed to resolving the cybersecurity threat;

initiating a first generated remediation action of the plurality of generated remediation actions in the computing environment, the computing environment being one of the plurality of computing environments; and initiating a second generated remediation action of the plurality of generated remediation actions in the computing environment in response to determining that the first generated remediation action was unsuccessful in resolving the cybersecurity threat.

2. The method of claim 1, further comprising:

the initiating the first generated remediation action of the plurality of generated remediation actions, wherein the first generated remediation action is directed to a first environment of the plurality of computing environments; and the initiating the second generated remediation action of the plurality of generated remediation actions, wherein the second generated remediation action is directed to a second environment of the plurality of computing environments.

3. The method of claim 1, further comprising:

the initiating the first generated remediation action of the plurality of generated remediation actions, wherein the first generated remediation action is directed to a first layer of the computing environment; and the initiating the second generated remediation action of the plurality of generated remediation actions, wherein the second generated remediation action is directed to a second layer of the computing environment.

4. The method of claim 1, wherein the generating the context further comprises:

generating the threat summary based on the plurality of detected events; and the generating the context based on at least a portion of the threat summary.

5. The method of claim 4, wherein the generating the threat summary further comprises:

generating a plurality of prompts, each generated based on a unique prompt template and at least an identifier of an entity of the computing environment; and processing each of the plurality of prompts.

6. The method of claim 5, wherein the entity is a principal of the computing environment.

7. The method of claim 5, further comprising:

the generating the threat summary based at least on a portion of each result of processing each of the plurality of prompts.

8. A non-transitory computer-readable medium storing a set of instructions for remediating a cybersecurity threat based on timeline generation utilizing generative artificial intelligence (AI), the set of instructions comprising:

one or more instructions that, when executed by one or more processors of a device, cause the device to:

detect the cybersecurity threat in a computing environment, the cybersecurity threat associated with at least an identity;

select a group of remediation actions based on the cybersecurity threat, from a predefined plurality of remediation actions, each remediation action executable in one of a plurality of computing environments, the plurality of computing environments including an infrastructure as a service (IaaS) environment and a platform as a service (PaaS) environment;

generate a timeline based on the at least the identity, wherein the timeline includes a plurality of detected events associated with the at least the identity in the computing environment;

generate a context based at least on the timeline, the group of remediation actions, and a threat summary of the cybersecurity threat;

generate a prompt for a generative artificial intelligence (AI) model based on a template, wherein the template is adapted based on one or more events from the timeline;

process the prompt and the context by utilizing the generative AI model, wherein the prompt is given a different weight than the context, and wherein the prompt, when processed by the generative AI model, outputs a plurality of generated remediation actions, and wherein each generated remediation action of the plurality of the generated remediation actions is directed to resolving the cybersecurity threat;

initiate a first generated remediation action of the plurality of generated remediation actions in the computing environment, the computing environment being one of the plurality of computing environments; and initiate a second generated remediation action of the plurality of generated remediation actions in the computing environment in response to determining that the first generated remediation action was unsuccessful in resolving the cybersecurity threat.

9. A system for remediating a cybersecurity threat based on timeline generation utilizing generative artificial intelligence (AI), the system comprising:

a processing circuitry;

a memory, the memory containing instructions that, when executed by the processing circuitry, configure the system to:

detect the cybersecurity threat in a computing environment, the cybersecurity threat associated with at least an identity;

select a group of remediation actions based on the cybersecurity threat, from a predefined plurality of remediation actions, each remediation action executable in one of a plurality of computing environments, the plurality of computing environments including an infrastructure as a service (IaaS) environment and a platform as a service (PaaS) environment;

generate a timeline based on the at least the identity, wherein the timeline includes a plurality of detected events associated with the at least the identity in the computing environment;

generate a context based at least on the timeline, the group of remediation actions, and a threat summary of the cybersecurity threat;

generate a prompt for a generative artificial intelligence (AI) model based on a template, wherein the template is adapted based on one or more events from the timeline;

process the prompt and the context by utilizing the generative AI model, wherein the prompt is given a different weight than the context, and wherein the prompt, when processed by the generative AI model, outputs a plurality of generated remediation actions, and wherein each generated remediation action of the plurality of the generated remediation actions is directed to resolving the cybersecurity threat;

initiate a first generated remediation action of the plurality of generated remediation actions in the computing environment, the computer environment being one of the plurality of computing environments; and initiate a second generated remediation action of the plurality of generated remediation actions in the computing environment in response to determining that the first generated remediation action was unsuccessful in resolving the cybersecurity threat.

10. The system of claim 9, wherein the memory contains further instructions which when executed by the processing circuitry further configure the system to:

the initiate the first generated remediation action of the plurality of generated remediation actions, wherein the first generated remediation action is directed to a first environment of the plurality of computing environments; and the initiate a second remediation action of the plurality of generated remediation actions, wherein the second remediation action is directed to a second environment of the plurality of computing environments.

11. The system of claim 9, wherein the memory contains further instructions which when executed by the processing circuitry further configure the system to:

the initiate the first generated remediation action of the plurality of generated remediation actions, wherein the first generated remediation action is directed to a first layer of the computing environment; and the initiate the second generated remediation action of the plurality of generated remediation actions, wherein the second generated remediation action is directed to a second layer of the computing environment.

12. The system of claim 9, wherein the memory contains further instructions that, when executed by the processing circuitry for generating the context, further configure the system to:

generate the threat summary based on the plurality of detected events; and generate the context based on at least a portion of the threat summary.

13. The system of claim 12, wherein the memory contains further instructions that, when executed by the processing circuitry for generating a threat summary, further configure the system to:

generate a plurality of prompts, each generated based on a unique prompt template and at least an identifier of an entity of the computing environment; and process each of the plurality of prompts.

14. The system of claim 13, wherein the entity is a principal of the computing environment.

15. The system of claim 13, wherein the memory contains further instructions which when executed by the processing circuitry further configure the system to:

generate the threat summary based at least on a portion of each result of processing each of the plurality of prompts.

* * * * *